B. A. BEHREND.
DYNAMO ELECTRIC MACHINE.
APPLICATION FILED JUNE 25, 1906.
1,135,656.
Patented Apr. 13, 1915.
2 SHEETS—SHEET 2.
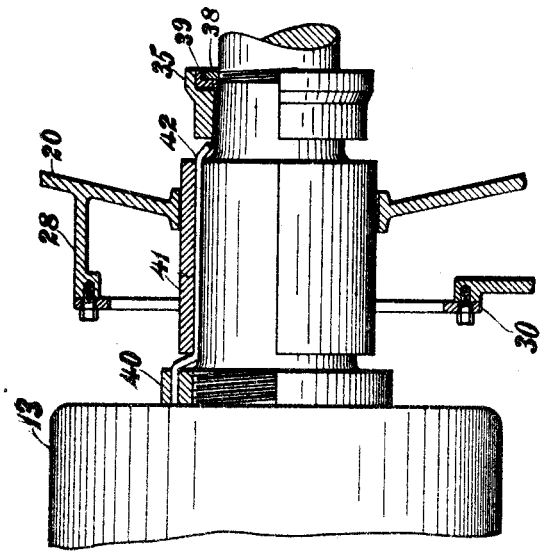
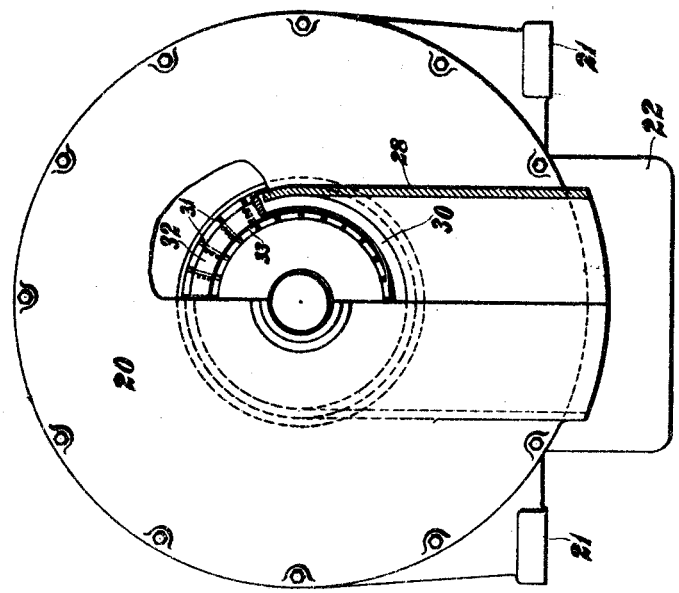
WITNESSES:
Bernard A. Behrend
INVENTOR
BY
ATTORNEY.

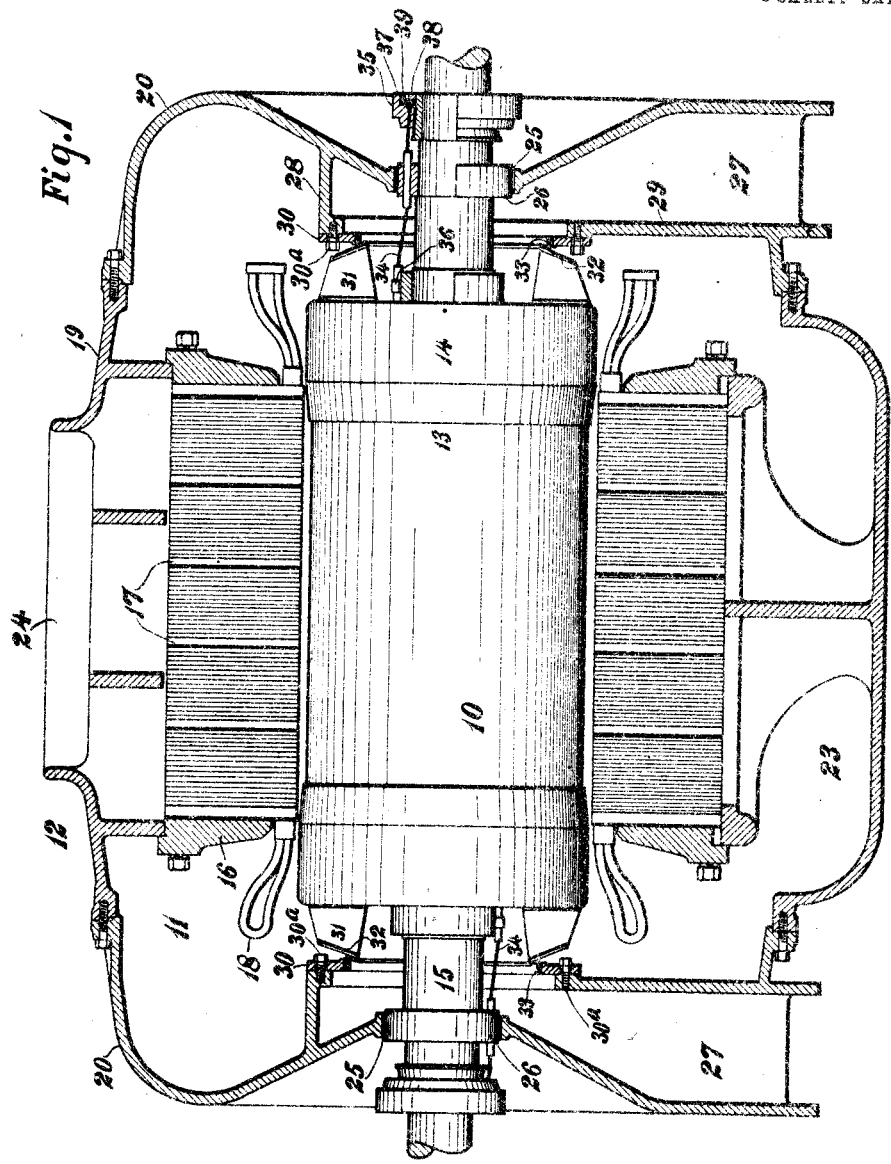

UNITED STATES PATENT OFFICE.

BERNARD A. BEHREND, OF NORWOOD, OHIO, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,135,656.     Specification of Letters Patent.     Patented Apr. 13, 1915.

Application filed June 25, 1906. Serial No. 323,224.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to high speed turbo-alternators.

One of the objects of my invention is to provide an improved housing or casing for completely inclosing a dynamo-electric machine, which housing is so constructed that air can be drawn from a point outside of the building in which the machine is located, by fans or blowers on the ends of the rotary member or rotor, into the housing, preferably at the bottom thereof, and then forced through the circumferential passageways of the stationary member or stator.

A further object is to provide an improved means for supporting the conductors leading from the winding of the rotary member to the collector rings.

My invention consists in the details of construction, and in the combinations and arrangements of parts described in the specification and set forth in the appended claims.

For a better understanding of my invention, reference is had to the accompanying drawings forming a part of this application in which—

Figure 1 is a partial vertical sectional elevation of a dynamo-electric machine equipped with my invention; Fig. 2 is an end elevation, with parts broken away, on a slightly reduced scale; and Fig. 3 is a modification of the supporting and retaining means for the collector leads.

Referring now to the figures of the drawings, I have shown at 10 the rotary member or rotor, and at 11, the stationary member or stator of a turbo-generator, both of which are inclosed by a casing or housing 12. The rotor, which in this case is the field member, includes the core 13, and coil retaining and protecting end rings 14, the core being mounted on a shaft 15 passing through suitable openings in the housing. The core of the stator 11, which in this case is an armature, consists of laminæ which are clamped between end heads 16 and supported on the housing. The laminæ of the core are arranged in groups, which are spaced apart by any suitable means forming circumferential ventilating passageways 17. The stator is provided with the usual armature windings 18.

The housing consists preferably of three parts, a main central portion 19 and end portions 20. The central portion of the housing supports the armature core, which may be dove-tailed to the housing or secured thereto in any suitable manner, and is provided with supporting feet or pedestals 21 adapted to rest on a base or foundation. The lower part of the housing is provided with an enlarged portion 22, forming an air chamber 23 which communicates with the air passageways 17 of the armature core. The housing is provided at the top with a chimney 24, through which the air after passing through the circumferential passageways 17 can escape from the machine. The end portions of the housing are each provided with a circular flanged opening 25 through which the shaft extends, the flange fitting closely around a stuffing ring 26 secured to the shaft, the purpose of which will be explained more fully. Each end portion is also provided with a chamber 27 for the admission of air, which chamber is open at the bottom and around the shaft. The chamber is formed by an inwardly extending flange 28 on the inner surface of the housing, which flange extends around the upper portion of the shaft, at a suitable distance therefrom, on an arc of a circle concentric therewith, and extends vertically downward on each side of the shaft. Below the shaft the vertical parallel portions of the flange are covered with an inner wall or partition 29 which extends from the bottom upward toward the shaft, the upper edge being curved on an arc of the same radius as the upper portion of the flange.

Secured to the inner edge of the flange 28 and partition 29, around the opening is an adjustable plate 30, in this case, a ring, extending inwardly toward the shaft, which ring limits the size of the air opening around the shaft. The ring is secured to the housing by bolts 30ª. As is shown the bolt holes in the ring are slightly larger than the bolts so that the position of the ring can be adjusted. Secured to each end of the rotor is a fan or blower comprising fan-blades 31 and a plate 32 covering the blades and having at its inner edge a shroud-ring 33 fitting closely within the ring 30. The removable rings 30 provide means for adjusting the size of the openings around the shaft for blowers of different sizes. In case larger openings are desired the rings can be removed and the openings machined to a larger size. If the openings are too small, other rings having larger openings can be easily substituted. In case there are slight inaccuracies of workmanship or the parts are not accurately assembled, the rings 30 can be adjusted to properly fit the fan-blades.

At 34 are shown collector leads or conductors connecting the field winding to the collector rings 35 on the shaft outside of the housing. The blades are retained in position and prevented from being displaced at high speeds by cleats 36 and by the stuffing rings 26 through one of which each lead extends. As was stated before, the end walls of the housing fit closely around the rings 26, so as to leave only a very small clearance. Thus the combined conductor retaining rings and stuffing rings dispense with the necessity of large openings between the shaft and the housing which would otherwise be necessary if the leads were secured to the shaft by cleats only. The collector rings 35 are in this case seated on sleeves each having an inclined surface, which sleeves may be secured to the shaft in any suitable manner. The rings are each provided with an undercut portion forming a shoulder 37 which extends over the clamping nut 38 and separating insulation 39, so as to protect the latter and prevent its being displaced at high speeds.

In Fig. 3 I have shown a slight modification of my conductor retaining means. The collector lead or conductor is retained in position by the clamping nut 40 and by a stuffing ring 41 of considerable length in the shape of a sleeve or collar which is provided with a slot 42 in its inner surface through which the lead or conductor passes. With this type of retaining means, practically the entire length of the lead is protected against the action of centrifugal force. As in the previous case the flanged inner surface of the shaft opening of the housing fits closely around the sleeve 41.

When the rotor is in operation, a large volume of air is drawn by the fans into the chambers 27 which may be connected to suitable air conducting tubes or pipes, and passes into the housing through the annular openings between the rings and the shaft. The air then passes into the large receiving chamber 23 at the bottom of the housing, from which the air passes upward in parallel paths through the stator on both sides of the rotor and out through the chimney 24.

By means of the rings or sleeves 26 or 41 the collector leads are securely retained in position and pass to the collector rings on the outside of the housing without necessitating a large opening around the shaft and without in the least weakening the shaft, as is the case when the leads are passed through slots or openings in the shaft. Thus the rings or sleeves not only serve to retain the collector leads in position but also serve as stuffing rings around the shaft to prevent the hot, or oil laden air in the immediate vicinity of the generator from being drawn into the housing through the shaft openings. By providing the collector rings with the undercut portions in which the adjusting nut and separating insulation are located, the insulation is protected from being displaced by centrifugal force, the collector has a better appearance and considerable space in an axial direction is saved. I have in this case shown the collector rings at both ends of the machine but if desired both rings may be mounted on the shaft at one end of the machine.

I do not wish to be confined to the details of construction here shown, but aim in my claims to cover all modifications which do not involve a departure from the spirit and scope of my invention.

What I claim as new and desire to secure by Letters Patent is:—

1. In a dynamo-electric machine, a stator, a rotor having fans or blowers at the ends thereof, a housing or casing surrounding the stator and rotor and having end walls extending toward the shaft, said housing having air inlet openings around the rotor shaft and an air outlet opening at the top, and removable members within the housing each having a circular opening, adjustably secured to the end walls of the housing over the air inlet openings, and fitting closely around the fan-blades.

2. In a dynamo-electric machine, a stator, a rotor having a fan or blower secured to each end thereof, a housing or casing surrounding the stator and rotor and open at the top for the escape of air, said housing having end walls extending toward the shaft and providing air inlet openings around the rotor shaft, and a removable member having a circular opening concentric with the shaft, secured in position over each inlet opening and fitting closely around the fan or blower.

3. In a dynamo-electric machine, a stator, a rotor having a fan or blower at each end thereof, a housing inclosing the stator and rotor and having an air inlet chamber at each end thereof and an air outlet opening at the top, each chamber having an opening around the rotor shaft, and a removable plate having a circular opening and secured to the wall of the chamber around the shaft adjacent the fan.

4. In a dynamo-electric machine, a stator, a rotor having a fan or blower at each end thereof, a housing inclosing the stator and rotor, and having an air inlet chamber at each end and an air outlet opening at the top, each chamber having an opening around the rotor shaft, and a removable plate covering the opening, said plate extending inward toward the shaft and having a circular opening adjacent the fan or blower.

5. In a dynamo-electric machine, a stator, a rotor having a fan or blower at its end, a housing or casing for the machine, and an air admission chamber on the inner side of an end of the housing comprising a flange extending inward axially from the end of the housing toward the fan, over the shaft, and downward on each side thereof, and a wall or partition between the axially inner edges of the lower portions of the flange below the shaft.

6. In a dynamo-electric machine, a stator, a rotor having a fan or blower at an end thereof, a housing inclosing the stator and rotor and having an air inlet chamber at the end thereof adjacent said fan and an air outlet opening at the top, said inlet chamber having an opening around the rotor shaft, and a removable plate having a central opening and secured to the wall of said chamber around the shaft adjacent said fan.

In testimony whereof I affix my signature, in the presence of two witnesses.

BERNARD A. BEHREND.

Witnesses:
 HARRIET SUTPHIN,
 LAURA E. WELCH.